(12) United States Patent
Bagard et al.

(10) Patent No.: US 11,674,553 B2
(45) Date of Patent: Jun. 13, 2023

(54) TORSION DAMPING DEVICE WITH MAIN DAMPER AND ADDITIONAL DAMPER

(71) Applicant: VALEO EMBRAYAGES, Amiens (FR)

(72) Inventors: Didier Bagard, Amiens (FR); Pierre Boucheny, Amiens (FR); David Denizot, Amiens (FR); Olivier Marechal, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 420 days.

(21) Appl. No.: 16/649,458

(22) PCT Filed: Sep. 20, 2018

(86) PCT No.: PCT/FR2018/052292
§ 371 (c)(1),
(2) Date: Mar. 20, 2020

(87) PCT Pub. No.: WO2019/058057
PCT Pub. Date: Mar. 28, 2019

(65) Prior Publication Data
US 2020/0256396 A1 Aug. 13, 2020

(30) Foreign Application Priority Data

Sep. 22, 2017 (FR) ..................... 17 58776
Feb. 12, 2018 (FR) ..................... 18 51173

(51) Int. Cl.
*F16D 3/12* (2006.01)
*F16F 15/123* (2006.01)

(52) U.S. Cl.
CPC .......... *F16D 3/12* (2013.01); *F16F 15/12373* (2013.01); *F16F 2232/02* (2013.01)

(58) Field of Classification Search
CPC .... F16D 3/12; F16F 2232/02; F16F 15/12373
(Continued)

(56) References Cited

U.S. PATENT DOCUMENTS 4,494,642 A * 1/1985 Hashimoto ....... F16F 15/12366
192/213.22
5,059,156 A 10/1991 Woerner et al.

FOREIGN PATENT DOCUMENTS

DE 10 2015 119 099 A1 6/2016
EP 0 325 724 A2 8/1989
(Continued)

OTHER PUBLICATIONS

International Search Report dated Feb. 22, 2019 in PCT/FR2018/052292 filed on Sep. 20, 2018, 3 pages.

*Primary Examiner* — Greg Binda
(74) *Attorney, Agent, or Firm* — Oblon, McClelland, Maier & Neustadt, L.L.P.

(57) ABSTRACT

A torsion damping device for a vehicle transmission line including a first rotating element, a second rotating element, a main damper, a third rotating element and an additional damper. When the angular displacement between the first and second rotating elements is greater than zero and less than said first threshold, the at least one main spring is compressed while the third rotating element is rotated by the first rotating element via the uncompressed additional spring, and when the angular displacement between the first and second rotating elements is greater than said first threshold, the at least one main spring is compressed and the at least one additional spring is compressed in parallel, the compression of the additional spring being accompanied by the relative rotation of the first rotating element and the third rotating element.

17 Claims, 5 Drawing Sheets

(58) Field of Classification Search
USPC .................. 464/68.8; 192/213, 213.2, 213.22
See application file for complete search history.

(56) References Cited

FOREIGN PATENT DOCUMENTS

| | | |
|---|---|---|
| FR | 2 772 862 A1 | 6/1999 |
| FR | 3 034 481 A1 | 10/2016 |
| JP | 2002-039210 A | 2/2002 |
| WO | WO 2016/030615 A1 | 3/2016 |

\* cited by examiner

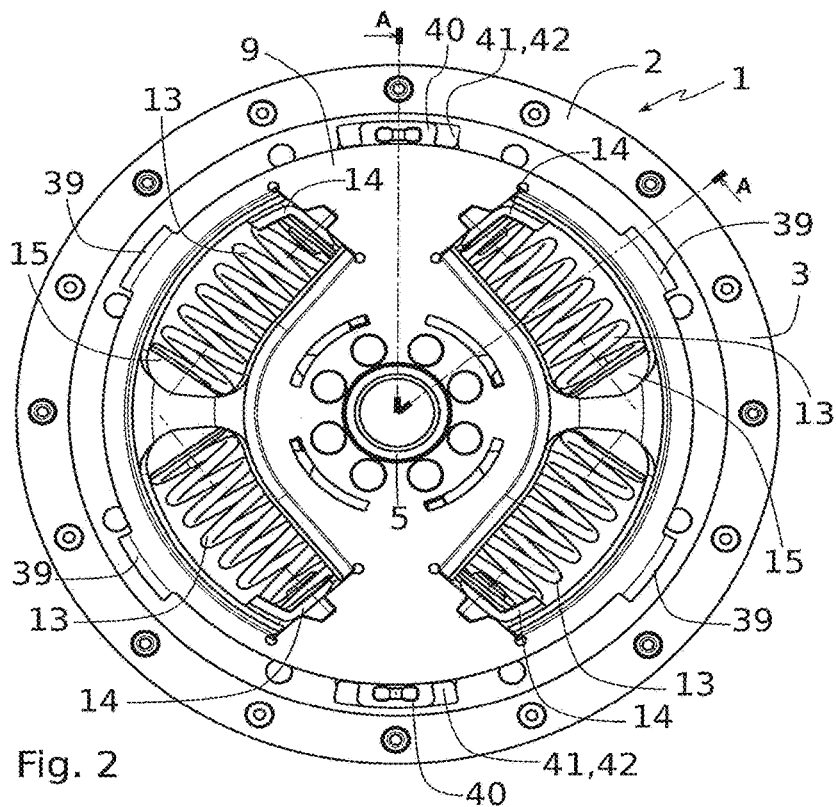
Fig. 2
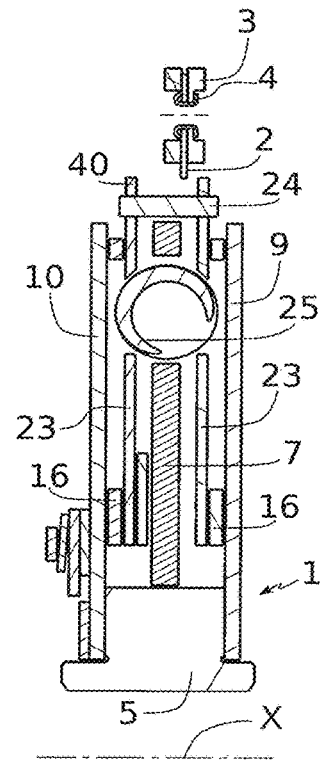
Fig. 3
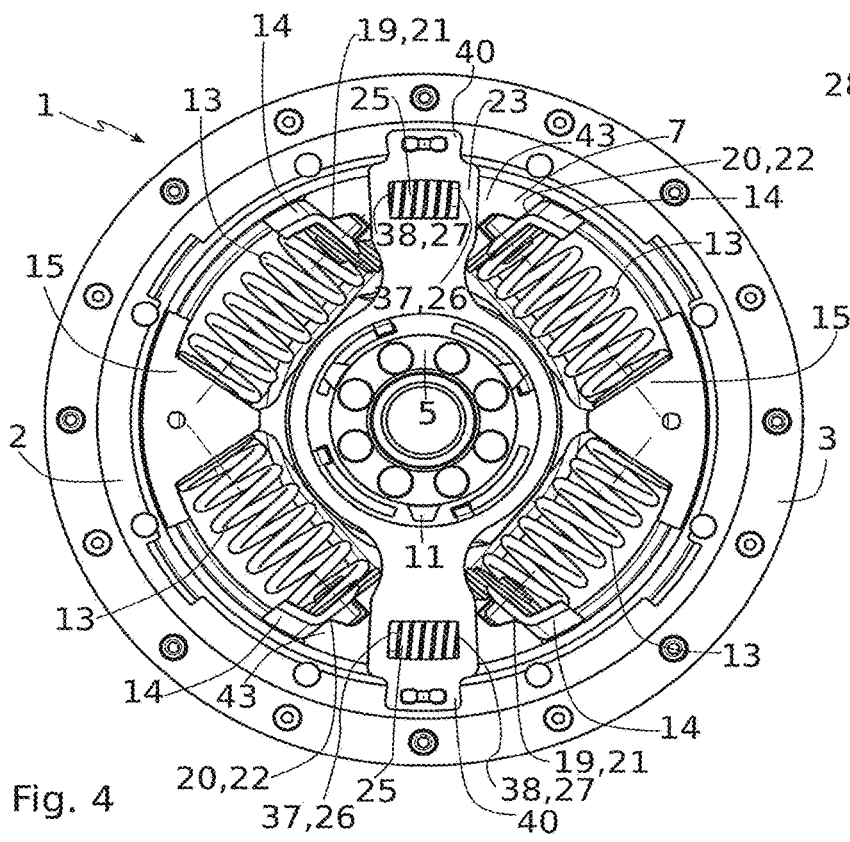
Fig. 4
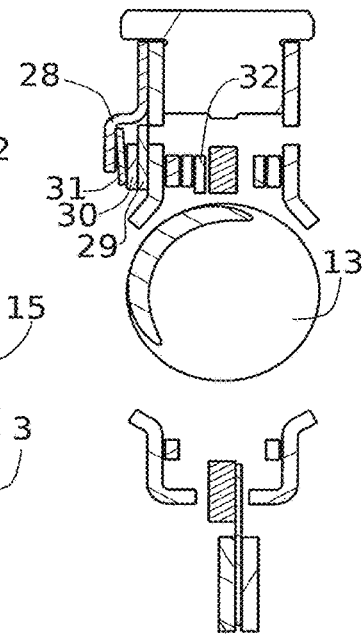

TORSION DAMPING DEVICE WITH MAIN DAMPER AND ADDITIONAL DAMPER

BACKGROUND

The invention relates to the field of torque transmission in powered devices and relates to a torsion damping device for a vehicle transmission line.

DESCRIPTION OF THE RELATED ART

Powered vehicles generally include such torsion damping devices, which can be incorporated into various elements of the transmission line. For example, a dual mass flywheel, a clutch disc or a torque limiter can include a torsion damping device making it possible to filter the acyclisms of the engine and other torsional oscillations. This filtering is conventionally performed by one or more torsion dampers that are spring-damper combinations working in torsion and allowing, during the transmission of the torque, the relative rotation of a first rotating element for transmitting a torque, coupled upstream of the transmission line, and a second rotating element for transmitting the torque, coupled downstream of the transmission line. The relative rotation can be allowed by springs and the damping can be performed by a friction device provided with friction washers axially loaded by spring washers, so as to dissipate by friction some of the energy stored in the springs.

The torque opposing the relative rotation of the two rotating elements depends on the angle of this relative rotation according to a characteristic curve of each torsion damping device.

During the design of such a torsion damping device, particular attention is paid to the selection, sizing and arrangement of the springs, in order to obtain a characteristic curve suited to a particular application.

BRIEF SUMMARY OF THE INVENTION

The invention aims to improve the torsion damping devices of the prior art by proposing such a device with an adjustable characteristic curve.

To this end, the invention relates to a torsion damping device for a vehicle transmission line, comprising:
  a first rotating element for transmitting a torque;
  a second rotating element for transmitting the torque;
  a main damper including at least one main spring inserted between the first rotating element and the second rotating element and permitting, when it deforms, the relative rotation about an axis of rotation of the first and second rotating elements.

The torsion damping device also includes:
  a third rotating element for transmitting the torque mounted rotating in relation to the first and second rotating elements about said axis of rotation;
  an additional damper including at least one additional spring mounted both in the first rotating element and in the third rotating element;
  the second and third rotating elements respectively including a first stop and a complementary second stop, arranged so that: when the angular displacement between the first and second rotating elements is greater than zero and less than a first threshold of angular displacement between the first and second rotating elements from a resting relative angular position of the first and second rotating elements in which no torque is transmitted, said at least one main spring is compressed while the third rotating element is rotatably coupled to the first rotating element via the uncompressed additional spring; and when the angular displacement between the first and second rotating elements is greater than said first threshold, the first stop and the complementary second stop are pressing against each other, the at least one main spring being compressed and the at least one additional spring being compressed in parallel between the first rotating element and the third rotating element.

In other words, the second and third rotating elements respectively include a first stop and a complementary second stop, arranged so that:
  when the angular displacement between the first and second rotating elements, from a resting relative angular position of the first and second rotating elements in which no torque is transmitted, is greater than zero and less than a first threshold, the additional spring allows the first element to rotate the third element in relation to the second element, without deformation of the spring; and
  when the angular displacement between the first and second rotating elements, from a resting relative angular position in which no torque is transmitted, is greater than zero and greater than a first threshold, the first stop and the complementary second stop are pressing against each other and the at least one additional spring deforms in parallel with the main spring between the first rotating element and the second rotating element via the third rotating element.

In the description and the claims, the terms "compressed" or "compression", and "prestressed" or "prestressing", when they refer to the springs, are used as follows:
  the prestressing of a spring denotes the fact that this spring is mounted in one or more recesses that are smaller than the initial length of the spring, the latter therefore exerting, due to its elasticity, a force against the walls of the recesses;
  the compression of a spring denotes the fact that this spring is compressed by two mobile parts coming closer together.

The prestressing of a spring is therefore in effect even when the torsion damping device is at rest, without any torque being transmitted. The compression of a spring only occurs during torque transmission; parts that are mobile in relation to each other change the configuration of the recesses of the spring and compress it.

A torsion damping device according to the invention has, for the relative rotation of the first and second rotating elements from a resting angular position of the dampers in which no torque is transmitted to an end position of the dampers, two operating phases:
  a first operating phase in which the angular displacement between the first rotating element and the second rotating element is less than said first threshold, the main damper being arranged to be deformed during this first phase while the third rotating element is capable of being rotated by the first rotating element, without deformation of the additional spring, by means of the additional spring; and
  a second operating phase in which the torque transmitted is sufficient for the angular displacement between the first rotating element and the second rotating element to be greater than said first threshold, the deformation of the main damper continuing during this second phase while the relative rotation of the third rotating element and the second rotating element is prevented by the first stop pressing against the complementary second stop, so that the torque transmitted makes it possible to deform the additional spring as well and permits the relative rotation of the first rotating element and the second and third rotating elements.

An increase in the stiffness of the damping device is thus obtained in a reliable and stable manner during the second operating phase in which the main damper and the additional damper are working simultaneously, while only the main damper is working during the first operating phase.

Such a device advantageously replaces an end stop between the first and second rotating elements, avoiding any mechanical impact and associated vibrations.

This second operating phase is particularly advantageous in the case of a large-displacement main damper, for example with more than 30 degrees of angular damping travel.

The torsion damping device can include the following additional features, alone or in combination:
- the first rotating element includes at last one first additional recess and the third rotating element includes at least one second additional recess, the at least one first and second additional recesses being arranged axially facing so that the at least one additional spring is inserted into these facing recesses;
- the first rotating element includes at least one arm extending radially and arranged circumferentially between two main springs, one of said first additional recesses being formed on this arm;
- the first rotating element includes at least one arm extending radially, a main spring pressing circumferentially directly or indirectly against this arm, a second additional recess being formed on this arm;
- the at least one main spring and the at least one additional spring are arranged so that at least one portion of the additional spring is located radially in the same plane perpendicular to said axis as one portion of the main spring. The entire additional spring is located radially in the same plane perpendicular to said axis as one portion of the main spring;
- the at least one main spring includes an outer radial edge and an inner radial edge and the at least one additional spring is arranged at least partially in a core centred on said axis and radially delimited by the inner and outer radial edges of the at least one main spring;
- the main damper includes at least two main springs and an additional spring is arranged circumferentially between two main springs;
- the main damper includes at least two groups of main springs, the main springs being arranged in series in each group, and an additional spring is arranged circumferentially between two groups of main springs;
- the main springs are arranged in series in each group by means of a phasing element, connecting in each group two consecutive main springs arranged in series;
- the main springs of the main damper are divided into a first spring stage and second spring stage, the first spring stage and the second spring stage being arranged in series by means of a phasing element, the torsion damping device being arranged so that, when the angular displacement between the first rotating element and the second rotating element reaches a third threshold of angular displacement between the first rotating element and the second rotating element from a resting relative angular position adopted by the second rotating element and the first rotating element when no torque is transmitted, the second spring stage ceases to compress;

Thus, by switching from an operating phase with two stages in series to an operating phase with a single spring stage on the main damper, the angular stiffness of the damper can be increased. For example, when the springs of the first and second stages are identical, the stiffness of the main damper doubles when the angular displacement between the first rotating element and the second rotating element increases beyond the third threshold. This can in particular make it possible to reduce the size of the additional spring or to reduce the quality of its wire;
- the torsion damping device is arranged so that the second spring stage ceases to compress when the angular displacement between the first rotating element and the second rotating element increases beyond the third threshold;
- the torsion damping device is arranged so that the second spring stage ceases to compress on any angular displacement between the first rotating element and the second rotating element greater than the third threshold;
- the torsion damping device is arranged so that the first spring stage continues to compress when the angular displacement between the first rotating element and the second rotating element exceeds the third threshold;
- the second spring stage ceases to compress when the angular displacement between the phasing element and the second rotating element reaches a fourth threshold of angular displacement between the phasing element and the second rotating element from a resting relative angular position adopted by the phasing element and the second rotating element when no torque is transmitted;
- the third threshold of angular displacement between the first rotating element and the second rotating element is less than or equal to the first threshold of angular displacement between the first and second rotating elements.

Thus, by switching from an operating phase with two stages in series to an operating phase with a single spring stage on the main damper, before the first stop and complementary second stop are pressing against each other, the angular stiffness of the damper is increased in the entire angular displacement range for which greater stiffness is desired, i.e. the angular displacement range in which the additional spring is compressed.
- the third threshold of angular displacement between the first rotating element and the second rotating element is less than or greater than the first threshold of angular displacement between the first and second rotating elements. A damping curve is obtained with three successive stiffnesses;
- the angle separating the first angular displacement threshold (A1) and the third angular displacement threshold (A3) is advantageously less than 10 degrees, preferably less than 5 degrees. This makes it possible to generate a connecting gradient and to create a transition between the start angular stiffness and the end angular stiffness;
- the third threshold of angular displacement between the first rotating element and the second rotating element is less than or equal to the first threshold of angular displacement between the first and second rotating elements;
- the second spring stage includes coil springs and the second stage of the main damper is arranged so that the springs of the second stage reach their compression limit, particularly with their coils solid, when the angular travel between the first rotating element and the second rotating element reaches the third threshold;

the second rotating element and the phasing element respectively include a third stop and a fourth stop, arranged so that: when the angular displacement between the first rotating element and the second rotating element reaches a third threshold of angular displacement between the first rotating element and the second rotating element from a resting relative angular position adopted by the second rotating element and the first rotating element when no torque is transmitted, the third stop and the fourth stop are pressing against each other and the second spring stage ceases to compress when the angular displacement between the first rotating element and the second rotating element increases beyond the third threshold;

the third stop is formed by a lug rigidly connected to the second rotating element for rotation therewith. This lug can extend axially;

the fourth stop is formed by a lug rigidly connected to the phasing element for rotation therewith. This lug can extend radially;

according to one embodiment, the angular stiffness of the first spring stage is different from the stiffness of the second spring stage;

when the first and third thresholds are such that the third threshold A3 is less than the first threshold, and when the characteristic damping curve shows, in one transmission direction, three successive stiffness gradients K1, K2 and K3; K1 being the stiffness obtained for an angular displacement less than the third threshold, K2 being the stiffness obtained for an angular displacement greater than the third threshold and less than the first threshold, and K3 being the stiffness obtained for an angular displacement greater than the first threshold; $1<K2/K1<5$, and preferably: $2<K2/K1<4$;

said first threshold is between 15 and 65 degrees, preferably between 25 and 50 degrees;

the device includes an angular end stop limiting the relative angular displacement between the first and second rotating elements, and the angle separating said first threshold from the angular end position is between 3 and 15 degrees, preferably between 3 and 10 degrees;

the ratio of the stiffness of the additional damper to the stiffness of the main damper is between 2 and 10, preferably between 3 and 8, for example 4 or 5. For example, the angular stiffness of the main damper is approximately 3 Nm/° and the angular stiffness of the additional damper is between 10 Nm/° and 15 Nm/°, for example between 12 Nm/° and 15 Nm/°, for example 14 Nm/°. When the main damper includes two spring stages arranged in series, this ratio should be taken into consideration when the first spring stage and the second spring stage of the main damper are operating in series, i.e. when the angular displacement between the first rotating element and the second rotating element is less than the third threshold;

one of the first rotating element and the second rotating element is rotatably coupled to a clutch disc and the other of the first rotating element and the second rotating element is rotatably coupled to a hub;

the third rotating element includes two additional guide washers arranged on either side of the first rotating element and axially holding the additional springs, and the second rotating element includes two main guide washers axially holding the main springs, each additional guide washer being arranged axially between the first rotating element and a main guide washer;

said second stop is formed by at least one radial tab arranged on each additional guide washer;

said complementary first and second stops are arranged radially outside the main springs.

Another object of the invention relates to a torsion damping device for a vehicle transmission line, comprising:

a first rotating element for transmitting a torque provided with a first recess;

a second rotating element for transmitting the torque provided with a second recess;

an elastic device inserted between the first rotating element and the second rotating element and permitting, when it deforms, the relative rotation about an axis of rotation of the first and second rotating elements, the elastic device including at least one spring that is mounted both in the first recess and in the second recess;

a friction device including:
  a friction washer arranged to rub directly or indirectly against the second rotating element;
  an axial support rigidly connected to the second rotating element for rotation therewith;
  a spring washer arranged between the axial support and the friction washer so as to exert an axial force on the friction washer in the direction of the second rotating element;
  an actuating washer including an actuating lug arranged circumferentially between a first end of said spring and the first rotating element so as to allow the relative rotation of the actuating washer and the second rotating element when the first end of the spring is moved by the first rotating element, via the actuating lug, in the direction of a second end of the spring opposite the first end;
  the actuating washer being capable of rotating the friction washer so that, when the actuating washer and the second rotating element rotate in relation to each other, the friction washer rubs directly or indirectly against the second rotating element.

The torsion damping device can include the following additional features, alone or in combination:

the actuating washer includes at least one axial finger engaging with a notch of the friction washer, to ensure the driving of the friction washer by the actuating washer;

the actuating washer and the friction washer are mounted for conjoint rotation;

the actuating washer includes at least one axial finger coupled with a notch of the friction washer;

if desired, there is circumferential clearance between the axial finger and the circumferential ends of the notch of the friction washer. The driving of the friction washer by the actuating washer can thus be delayed. The circumferential clearance can be of 3 to 5 degrees;

the actuating washer includes an annular portion connecting the actuating lug and the axial finger, and the second rotating element includes an annular friction surface against which the friction washer is pressed, the annular portion of the actuating washer, and the spring washer, the axial support and the friction washer being arranged on either side of the annular friction surface of the second rotating element;

axial clearance is left between the first rotating element and the annular portion of the actuating washer;

the annular portion of the actuating washer is mounted between the first rotating element and the annular friction surface with axial clearance allowing the rotation of the actuating washer in relation to the first rotating element;

the friction device is arranged such that the washer presses the friction washer against the second rotating element without holding the annular portion of the actuating washer against the first rotating element. Relative rotation between the first rotating element and the actuating washer is thus allowed, so that the friction washer is not driven by the first rotating element when the second end of the spring is compressed by the first rotating element in the direction of the first end of the spring. The friction generated by the friction washer is thus only obtained for one direction of transmission of the torque, for example from the gearbox input shaft in the direction of the engine;

the annular portion of the actuating washer can be mounted between the first rotating element and a third torque transmission rotating element, rotatably mobile about the axis, also with axial clearance allowing the rotation of the actuating washer in relation to the first rotating element;

the second rotating element includes a slot by which the axial finger passes through the second rotating element;

the axial support is formed from a collar rigidly connected to the second rotating element, the spring washer and the friction washer being arranged between this collar and the annular friction surface of the second rotating element;

the friction device includes an intermediate washer inserted between the spring washer and the friction washer;

the axial finger is at a distance from the intermediate washer;

the annular portion of the actuating washer is arranged axially between the first rotating element and the second rotating element;

the elastic device includes at least two groups of springs, the springs being arranged in series in each group by means of a phasing element, connecting the ends of the springs within a group of springs;

one of the first rotating element and the second rotating element is rotatably coupled to a torque input element and the other of these elements is rotatably coupled to a torque output element;

the actuating washer also includes an angular stop and the second rotating element includes a complementary stop, the angular stop and the complementary stop being arranged so that the actuating washer is rotatably coupled to the second rotating element when the second rotating element compresses the first end of the spring in the direction of the second end of the spring opposite the first end. Thus, due to the stop, the friction generated by the friction washer is only obtained in one direction of transmission of the torque, for example from the gearbox input shaft in the direction of the engine, the stop preventing the actuating washer from rotating in relation to the second rotating element in the other direction of transmission of the torque, for example from the engine to the gearbox input shaft;

an axial finger coupling the actuating and friction washers forms said angular stop and the slot forms said complementary stop;

the angular stop is arranged on the actuating lug of the actuating washer and the complementary stop is arranged on the second recess of the second rotating element so that the actuating lug is inserted circumferentially between the first end of the spring and a bearing face of the second recess;

in a resting angular position adopted by the device when no torque is transmitted, the at least one spring is mounted in said first and second recesses so that its ends are pressing simultaneously against a first bearing zone of the first recess and a second bearing zone of the second recess;

according to one embodiment, the elastic device includes at least two springs, the spring engaging with the actuating lug of the actuating washer being a delayed action spring, circumferential clearance being left between the actuating lug and the first end of the spring in the resting angular position of the damping device. The friction can thus be obtained with a "delayed effect";

according to one embodiment, the elastic device includes four springs and the actuating washer includes two actuating lugs and two springs each engage with an actuating lug of the actuating washer, these two springs being delayed action springs, circumferential clearance being left between each actuating lug and the first end of each delayed action spring in the resting angular position of the damping device.

The invention also relates to a transmission line for a vehicle including a clutch disc coupled to one of the first rotating element and the second rotating element and a hub rotatably coupled to the other of the first rotating element and the second rotating element.

According to one embodiment, the transmission line includes a flywheel capable of being mounted on a crankshaft, and a torque transmission mechanism, such as a torque limiter or a clutch mechanism arranged to transmit torque between the flywheel and the clutch disc.

BRIEF DESCRIPTION OF THE SEVERAL VIEWS OF THE DRAWINGS

A preferred embodiment of the invention will now be described with reference to the attached drawings, in which:

FIG. 2 is a front view of the device in FIG. 1;

FIG. 3 is a view along the line A-A in FIG. 2;

FIG. 4 is a similar view to FIG. 2, showing the inside of the device;

DETAILED DESCRIPTION OF THE INVENTION

Figure 1:
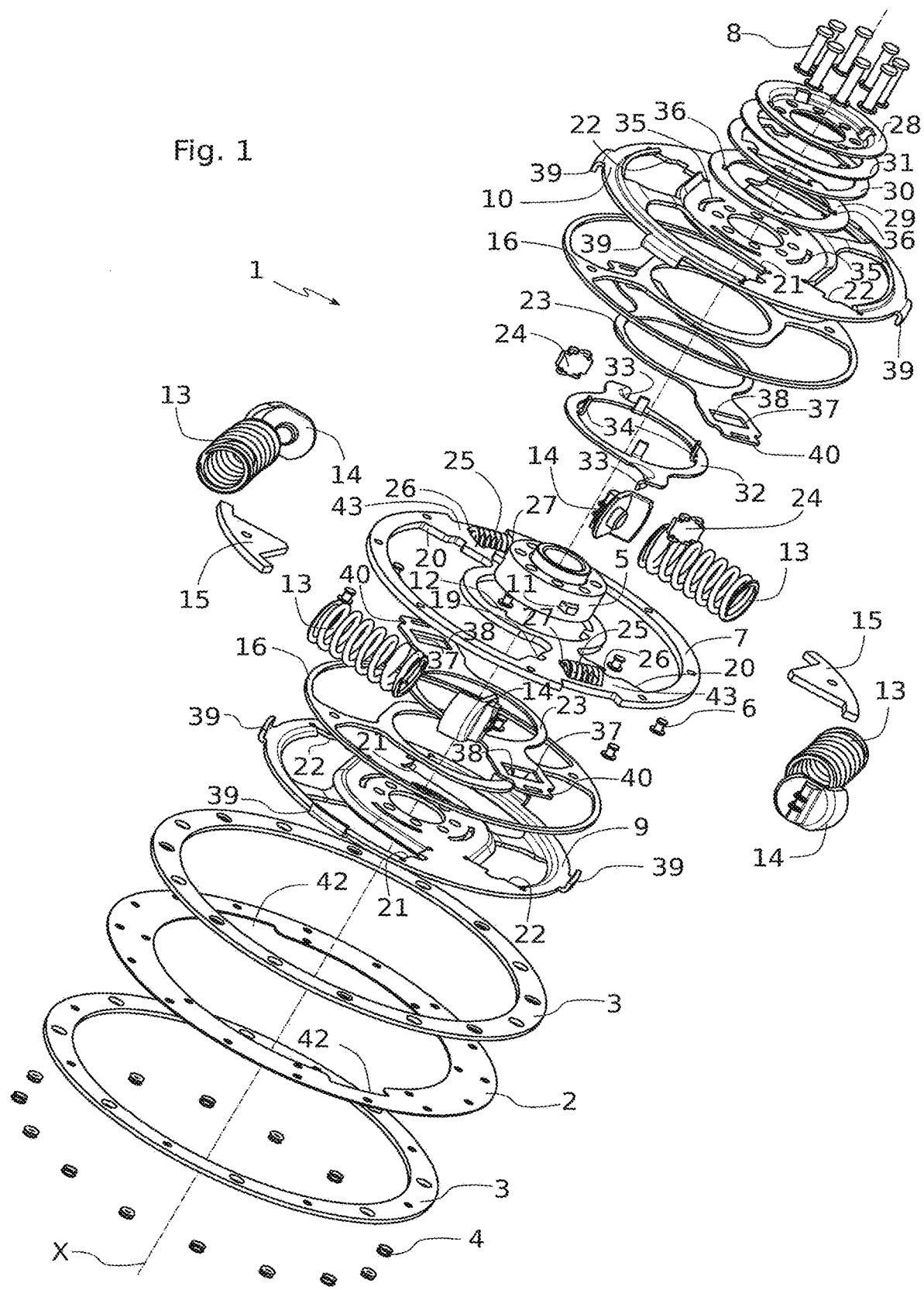
FIG. 1 is an exploded view of a torsion damping device according to the invention.

FIG. 1 shows a torsion damping device, coupled to a clutch disc 2 of a torque limiter (not shown in FIG. 1)

intended, in normal operation, to transmit torque by rotating about an axis X and to limit this transmission when this torque exceeds a certain value.

The terms "outer" and "inner" and the orientations "axial" and "radial" will be used in the description and the claims to denote elements of the damping device according to the definitions given in the description. The axis of rotation X determines the "axial" orientation. The "radial" orientation is orthogonal to the axis X. The "circumferential" orientation is orthogonal to the axis of rotation X and orthogonal to the radial direction. The terms "outer" and "inner" are used to define the position of one component relative to another, by reference to the axis of rotation X; a component near said axis is thus described as inner as opposed to an outer component situated radially peripherally. In addition, the angles and angular sectors expressed are defined relative to the axis of rotation X.

The damping device 1 includes:
a peripheral torque transmission member here consisting of a clutch disc 2 on either side of which are fixed two friction linings 3 by means of a first set of rivets 4;
a central torque transmission member here consisting of a hub 5.

The clutch disc 2 is fixed by a second set of rivets 6 to a first torque transmission rotating element that here consists of a disc referred to as the "drive plate" 7.

The hub 5 is fixed by a third set of rivets 8 to a second torque transmission rotating element that here consists of a pair of discs referred to as the guide washers 9, 10. A first guide washer 9 is fixed against one side of the hub 5 while a second washer 10 is fixed against an opposite side of the hub 5. The guide washers 9, 10 each include four angular stops 39 arranged on the circumference of the washer along two perpendicular diameters, the four angular stops 39 of each guide washer 9, 10 being arranged facing the four angular stops 39 of the other guide washer 9, 10. The angular stops 39 are produced by bending the material of the guide washers 9, 10.

The damping device includes a torsion damping device inserted between the drive plate 7 and the guide washers 9, 10 so that the drive plate 7 and the guide washers 9, 10 can rotate in relation to each other by compressing the damping device.

The damping device 1 is intended to be mounted in a torque transmission line, for example between an engine and the wheels of a vehicle, so that the clutch disc 2 and its linings 3 are pressed by means of an elastically-loaded pressure plate, against a bearing plate mounted rigidly connected to a flywheel, and so that the hub 5 is connected to a transmission shaft. The drive element rotates the friction linings 3 and therefore the drive plate 7 that is rigidly connected to it. The drive plate 7 compresses the damping device, which transmits the torque to the guide washers 9, 10 and therefore to the hub 5 that is rigidly connected to it. In transmitting the torque between the drive plate 7 and the guide washers 9, 10, the damping device, due to its elastic and friction properties, filters the acyclisms and other undesirable torsional movements as they pass through.

The damping device 1 also includes a first end stop and a second complementary end stop allowing the torque to be transmitted directly from the friction linings 3 to the hub 5, short-circuiting the torsion damping device beyond a predetermined angle of relative rotation between the drive plate 7 and the guide washers 9, 10.

Here, the first end stop consists of outer teeth 11 arranged on the circumference of the hub 5 and the second complementary end stop consists of inner teeth 12 in the centre of the drive plate 7.

The torsion damping device includes a main damper and an additional damper.

The main damper includes:
four springs 13 arranged circumferentially;
four stubs 14 for mounting these springs 13;
an element for phasing the springs 13 comprising two inserts 15 mounted diametrically opposite each other between two phasing discs 16.

The drive plate 7 and the guide washers 9, 10 each include openings for mounting the springs 13 defining two recesses, each for one pair of springs 13. The recesses of the drive plate 7 each have a first bearing zone 19 and an opposite second bearing zone 20. Likewise, the recesses of each guide washer 9, 10 each have a first bearing zone 21 and an opposite second bearing zone 20.

The damping device also includes a third torque transmission rotating element that, in this example, consists of two identical additional guide washers 23 mounted on either side of the drive plate 7 and rigidly connected by two spacers 24.

The additional damper includes two additional springs 25 each arranged in an additional recess of the drive plate 7. To this end, the drive plate 7 includes two diametrically opposite arms 43 each bearing one of these recesses. The main springs 13 are mounted between the arms 43. The additional guide washers 23 also include recesses for mounting the additional springs 25. For mounting the additional springs 25, the additional recesses of the drive plate 7 each include a first additional bearing zone 26 and a second additional bearing zone 27, and the recesses of the additional guide washers 23 each include a first additional bearing zone 37 and a second additional bearing zone 38.

The damping device 1 also includes a friction device intended to dissipate the energy of the springs and avoid oscillation phenomena. The friction device includes an axial support 28 fixed against the second guide washer 10 by the third set of rivets 8. The following are arranged between the axial support 28 and the second guide washer 10: a friction washer 29; an intermediate washer 30; and a spring washer 31, the latter applying a load to the friction washer 29 by means of the intermediate washer 30.

In addition, an actuating washer 32 is provided on the other side of the second guide washer 10 and includes two actuating lugs 33 together with four axial fingers 34. The actuating washer 32 is mounted so that the four axial fingers 34 pass through four corresponding slots 35 made in the second guide washer 10. The four axial fingers 34 are each inserted into a notch 36 of the friction washer 29. The actuating washer 32 is thus rotatably coupled to the friction washer 29. The actuating washer 32 is also mounted against the drive plate 7 so that the actuating lugs 33 each press on one of the first bearing zones 19 of the drive plate 7.

The mounting of the main springs 13 is shown on the front view in FIG. 2. The straight diameter of the damping disc 1 includes a first pair of main springs 13 mounted in series, and the straight diameter of the figure includes a second pair of main springs 13 mounted in series. FIG. 2 shows the damping disc 1 in the resting position, i.e. when it is not transmitting any torque, as its springs are not loaded. Each spring 13 is mounted, at one of its ends, in a stub 14 and, at the other of its ends, against an insert 15. Each stub 14 is supported straddling the drive plate 7 and the two guide washers 9, 10 and is therefore pressing on three bearing zones: a bearing zone of the drive plate 7 and a bearing zone of each guide washer 9, 10. Thus, each pair of springs 13 is mounted between two stubs 14 one of which is pressing simultaneously on the first bearing zone 19 of the drive plate 7 and on the first bearing zone 21 of each guide washer 9, 10, and the other stub 14 is pressing simultaneously on the second bearing zone 20 of the drive plate 7 and on the second bearing zone 22 of each guide washer 9, 10. The springs 13 are thus, in pairs, prestressed between the first bearing zones 19, 21 and the second bearing zones 20, 22. Between the springs 13 in each pair, the insert 15, rotatably mobile about the axis X by means of the phasing discs, ensures that the springs 13 in a pair are placed in series, and ensures the phasing, i.e. the angular coordination, of one pair with the other.

The cross-sectional view in FIG. 3 shows the stacking of the parts within the damping device 1.

The two additional guide washers 23 are arranged on either side of the drive plate 7, the actuating washer 32 being arranged between the drive plate 7 and one of these additional guide washers 23.

The phasing discs 16 are arranged on either side of the two additional guide washers 23, while the two guide washers 9, 10 are arranged on either side of the entire assembly. Only the friction device is situated axially outside the guide washers 9, 10, by means of the axial support 28.

FIG. 4 shows the damping disc 1 in FIG. 2 without the first guide washer 9, revealing the arrangement of the springs 13, 25, the drive plate 7 and the additional damper 25.

The additional springs 25 are mounted similarly to the main springs 13, straddling the drive plate 7 and the additional guide washers 23. Each additional spring 25 is prestressed between, on one side, simultaneous pressure on the first additional bearing zone 26 of the drive plate 7 and on the two first additional bearing zones 37 of the two additional guide washers 23, and, on the other side, simultaneous pressure on the second additional bearing zone 27 of the drive plate 7 and on the two second additional bearing zones 38 of the two additional guide washers 23.

In addition, the dimension, in the radial direction, of the recesses of the additional guide washers 23 is slightly smaller than the dimension of the additional recesses of the drive plate 7, so that an additional spring 25 is mounted straddling the drive plate 7 and is contained on either side of the drive plate 7 by the additional guide washers 23.

The additional guide washers 23 include at their radial ends tabs 40 to which are fixed the spacers 24.

With reference to FIGS. 1 and 4, the clutch disc 2 includes two diametrically opposite indentations 41 and the drive plate 7 includes two diametrically opposite indentations 42, the indentations 41, 42 facing each other. These indentations 41, 42 allow the relative rotation of the additional guide washers 23 and the drive plate 7, by the angular travel allowed by the additional springs 25.

Figure 5:
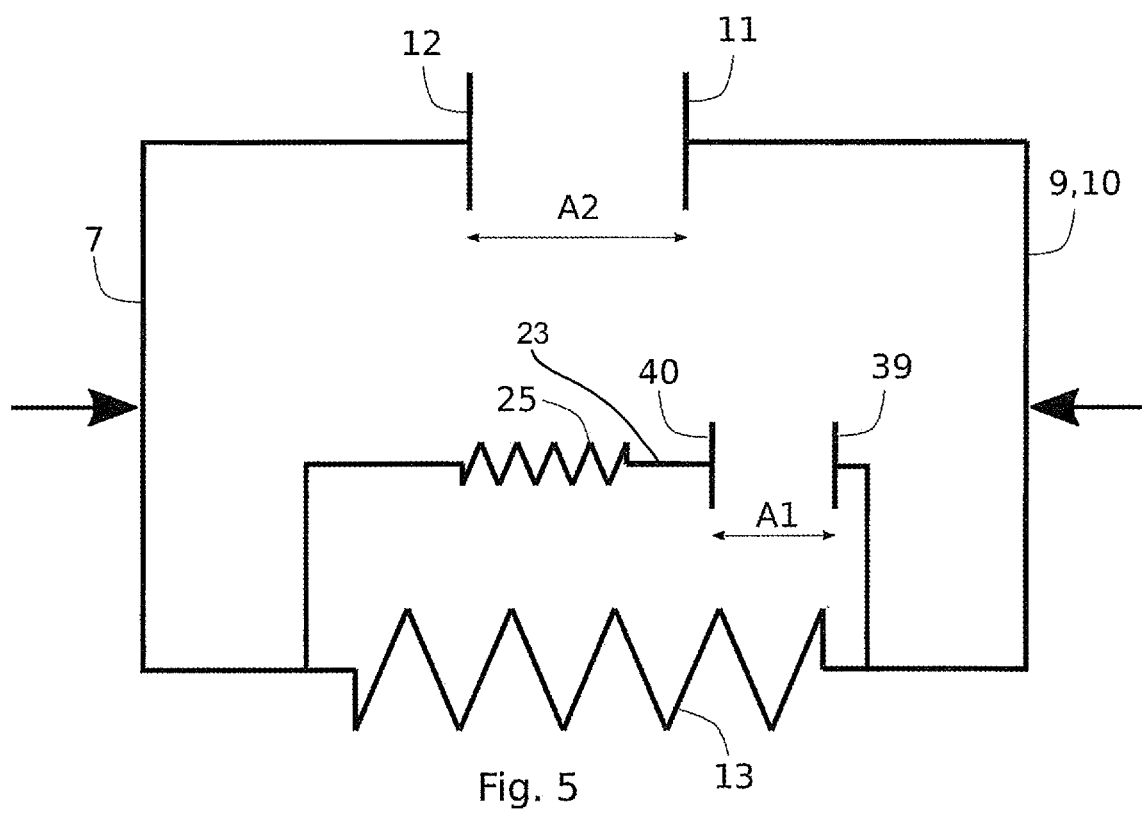
FIG. 5 is a block diagram illustrating the operation of the torsion damping device according to the invention.
Figure 6:
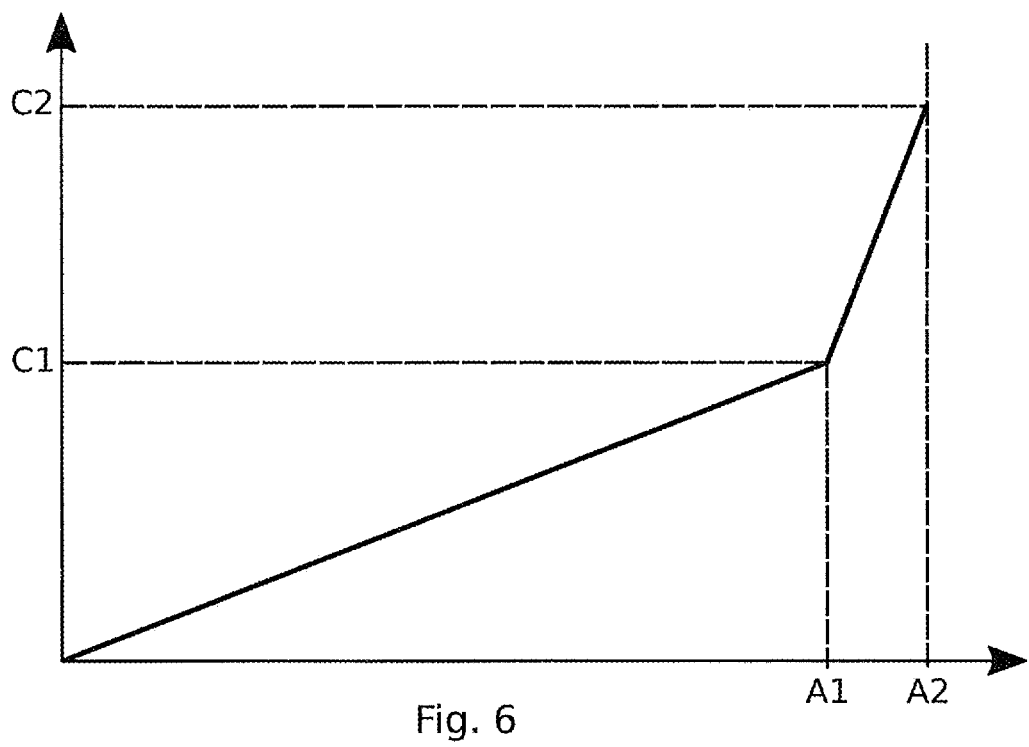
FIG. 6 is a characteristic curve corresponding to the diagram in FIG. 5.

FIGS. 5 and 6 illustrate how the torsion damping device works and particularly the behaviour of the main damper and the additional damper.

FIG. 5 is a block diagram in which the left-hand part of the figure shows the drive plate 7 and the right-hand part shows the guide washers 9, 10. The figure diagrammatically shows the following elements:

the end stops consisting of the outer teeth 11 of the hub 5 and the inner teeth 12 of the drive plate 7;

the stops consisting of the tabs 40 of the additional guide washers 23 and the angular stops 39 of the guide washers 9, 10;

the springs 13;

the additional guide washers 23 bearing the additional springs 25, all mounted in parallel with the springs 13.

The compression in FIG. 5 along the two arrows shown, i.e. the mutual closing together of the left-hand and right-hand parts of the figure, diagrammatically shows the relative rotation of the drive plate 7 and the guide washers 9, 10.

FIG. 5 can thus be compressed between a resting position as shown in the figure, in which the springs are not loaded, and an end position, at the end of a travel A2, in which the stops 11 and 12 are in contact.

Thus, when the figure is compressed (therefore, when there is relative rotation between the drive plate 7 and the guide washers 9, 10), from the resting position, the damping device works according to a first operating mode in which the springs 13 are compressed and therefore in which only the main damper is working. At the end of a travel A1, the stops 39 and 40 come into mutual contact and the springs 25 then start to be compressed, in parallel with the springs 13. This is a second operating phase that continues until the end of the travel A2. Beyond the travel A2, the dampers remain compressed but the torque can be transmitted directly between the drive plate 7 and the guide washers 9, 10.

FIG. 6 illustrates the change in the return torque (on the y-axis) exerted by the torsion damping device as a function of the angle of relative rotation (on the x-axis) between the drive plate 7 and the guide washers 9, 10. The curve shows two gradients corresponding to the two operating modes described above.

Between the origin and the angular travel A1, only the main damper is active, which is reflected by a first gradient on the curve, corresponding to a first characteristic stiffness of the main damper. Beyond the angular travel A1, corresponding to a torque T1, the second operating phase is reflected by a steeper second gradient, corresponding to the combination of the stiffnesses of the main damper and the additional damper, which are then working in parallel. This operating phase continues to the torque T2 corresponding to arrival at the end stop.

Figure 7:
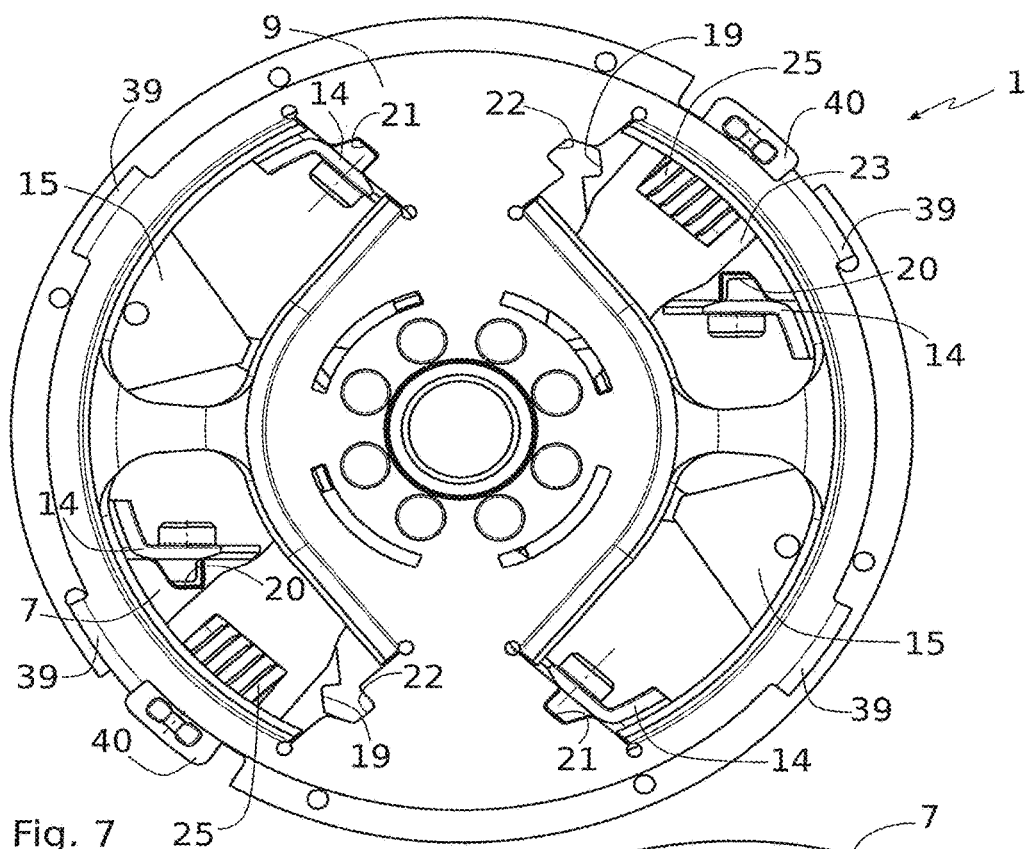
FIG. 7 is a front view of the torsion damping device in FIG. 1, illustrating the first operating phase of the damping device.
Figure 8:
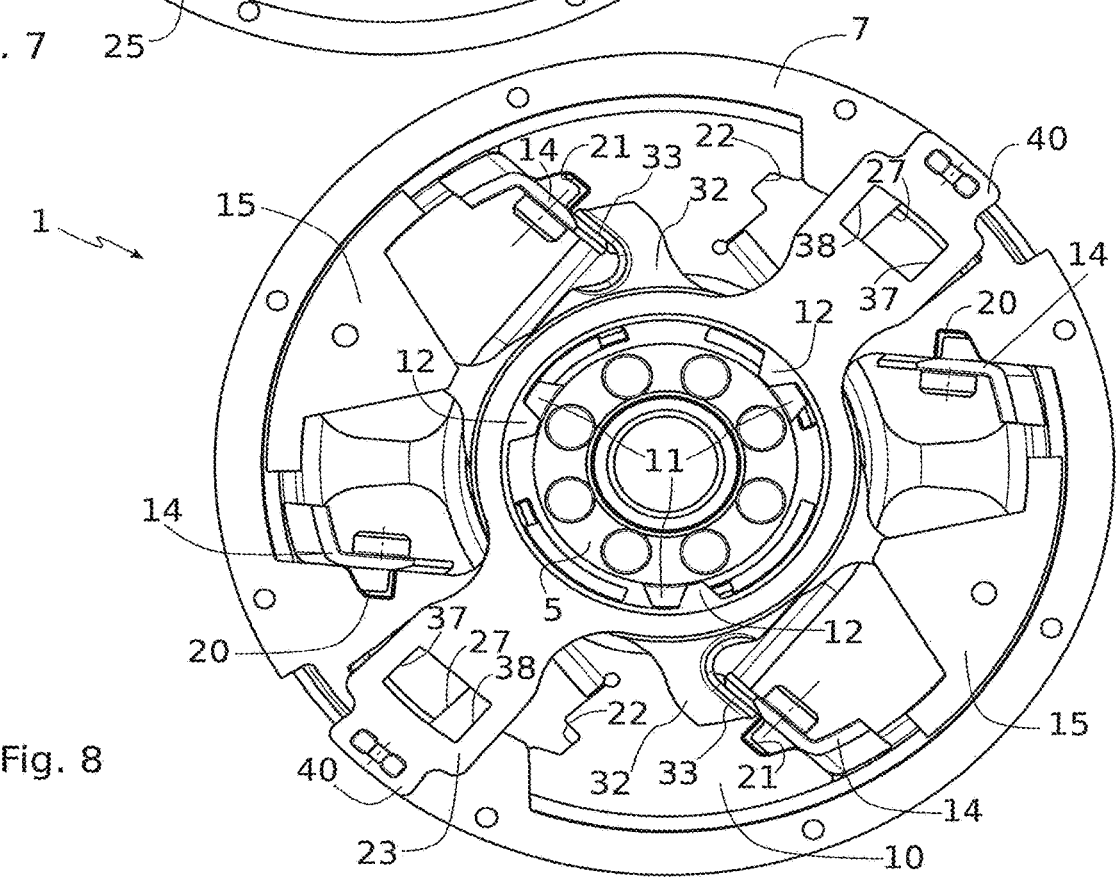
FIG. 8 is a front view of the torsion damping device in FIG. 1, illustrating the second operating phase of the damping device.

FIGS. 7 and 8 illustrate the implementation of these principles in the damping device 1 previously described.

FIG. 7 illustrates the damping disc 1 with a relative angular travel between the drive plate 7 and the guide washers 9, 10 that corresponds to the angular travel A1. In other words, FIG. 7 illustrates the damping disc 1 in the position that it adopts when a torque T1 is applied between the drive plate 7 and the guide washers 9, 10.

FIG. 8 illustrates the damping disc 1 with a relative angular travel between the drive plate 7 and the guide washers 9, 10 that corresponds to the angular travel A2. In other words, FIG. 8 illustrates the damping disc 1 in the position that it adopts when a torque greater than or equal to the torque T2 is applied between the drive plate 7 and the guide washers 9, 10.

These relative positions between the drive plate 7 and the guide washers 9, 10 are assessed in relation to a balanced position, taken at rest and shown in FIGS. 2 and 4, in which the springs 13, 25, although prestressed in their respective recesses, are not compressed by other elements. In this resting position, the first bearing zones 19 of the drive plate 7 and the first bearing zones 21 of the guide washers 9, 10 are axially aligned with each other. Similarly, the second bearing zones 20 of the drive plate 7 and the second bearing zones 22 of the guide washers 9, 10 are axially aligned with each other. Finally, the first 26 and second 27 additional bearing zones of the drive plate 7 are respectively axially aligned with the first 37 and second 38 additional bearing zones of the additional guide washer 23. In this resting position, the springs 13, 25 are simultaneously pressing on first and second bearing zones, without any angular offset of these bearing zones.

From this resting position, if a torque T1 is applied between the drive plate 7 and the guide washers 9, 10, the damping disc 1 therefore adopts the configuration in FIG. 7. In this example, it is assumed that the guide washers 9, 10 are fixed and the torque T1 is applied to the drive plate 7 in a clockwise direction. For greater clarity, the main springs 13 have not been shown.

FIG. 7 therefore corresponds to the end of the first operating phase. The first bearing zones 21 of the guide washers 9, 10 are each angularly offset in relation to the corresponding first bearing zone 19 of the drive plate 7, by an angle equal to the angular travel A1. Similarly, the second bearing zones 22 of the guide washers 9, 10 are each angularly offset in relation to the corresponding first bearing zone 20 of the drive plate 7, by the same angle. The springs are therefore compressed between the first bearing zones 20 of the drive plate 7 and the first bearing zones 21 of the guide washers 9, 10, which have moved closer together.

With regard to the additional damper, the drive plate 7 has been rotated, and therefore the additional springs 25, inserted in the recesses of the drive plate 7, have also been rotated. These additional springs 25 have in turn rotated the additional guide washers 23, without additional compression of these springs 25, as nothing prevents this rotation of the additional guide washers 23 relative to the guide washers 9, 10, on the angular displacement A1. In FIG. 7, the relative position of the drive plate 7, the additional guide washers 23 and the additional springs 25 is therefore the same as in the idle position.

At the end of the angular travel A1 (FIG. 7), each tab 40 of the additional guide washers 23 comes into contact with an angular stop 39 of the guide washers 9, 10.

FIG. 8 then corresponds to the end of the second operating phase. If, from the position in FIG. 7, the rotation of the drive plate 7 relative to the guide washers 9, 10 continues so that the angular travel A2 is reached, the torsion damping device then enters its second operating phase.

At the end of the angular travel A1 (FIG. 7), each tab 40 of the additional guide washers 23 has come into contact with an angular stop 39 of the guide washers 9, 10. The simultaneous rotation of the drive plate and the additional guide washers 23 in the same direction is therefore no longer possible. As the drive plate 7 continues its angular travel while the additional guide washers 23 remain in place against the angular stops 39, the additional springs 25 are compressed between the second additional bearing zone 27 of the drive plate 7 and the first additional bearing zone 37 of the additional guide washer 23, which therefore move closer together. During this angular travel, the main damper is therefore working jointly with the additional damper (in parallel), in accordance with the second operating phase. In FIG. 8, the springs 13, 25 have not been shown in order to reveal the bearing zones.

In the position in FIG. 8, corresponding to the end of the second operating phase, the inner teeth 12 of the drive plate 7 and the outer teeth 11 of the hub are in contact and, if the relative rotation continues, the torque is then transmitted directly via these elements, without damping.

FIGS. 7 and 8 are relative to one direction of relative rotation of the drive plate 7 and the guide washers 9, 10. In the other direction of relative rotation from the resting position, the compression of the springs in two phases takes place in the same way.

The torsion damping device described has a large damping displacement range. In this example, the value of the angular travel A1 is 42° and the value of the angular travel A2 is 47°.

Figure 9:
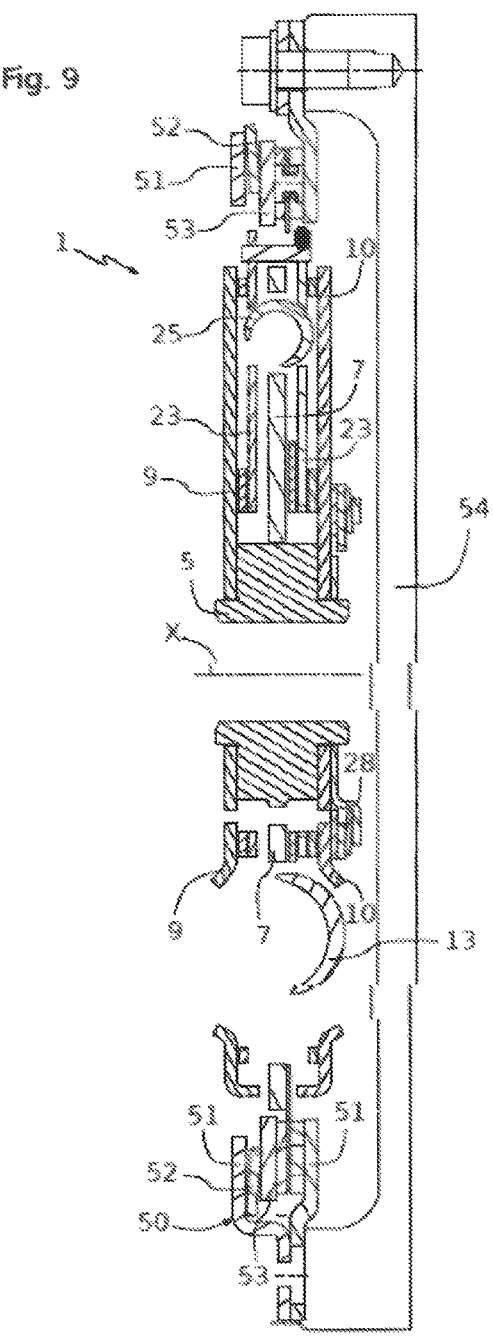
FIG. 9 shows the torsion damping device in FIGS. 1 and 2 mounted in a torque limiter of a vehicle.

FIG. 9 shows the torsion damping device 1 mounted in a torque limiter 50 of a vehicle. This torque limiter 50 includes two jaws 51 between which are mounted the friction linings 3. A spring washer 52 loads an intermediate washer 53 against the friction linings 3. The torsion damping device 1 is thus gripped between the intermediate washer 53 and a jaw 51 so that it can be rotated with the torque limiter 50. The torque limiter 50 is mounted on a flywheel 54 of the engine of a vehicle and the hub 5 is mounted on a transmission shaft (not shown) of this vehicle. The load of the spring washer 52 is calibrated so that, when the torque transmitted by the flywheel 54 to the transmission shaft, or from the transmission shaft to the flywheel 54, exceeds a predetermined limit, the friction linings can slide in relation to the torque limiter 50. In all cases, the torsion damping device 1 filters the torsional oscillations occurring between the flywheel 54 and the transmission shaft.

Figure 10:
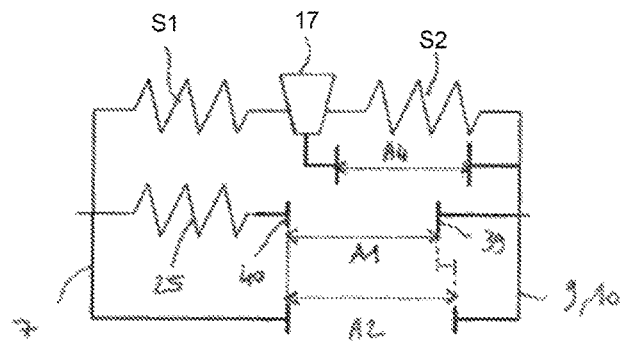
FIG. 10 diagrammatically shows a second embodiment of the invention.

According to a second embodiment of the invention, the main springs of the main damper are divided into a first spring stage S1 and second spring stage S2, the first spring stage S1 and the second spring stage S2 being arranged in series by means of a phasing element 17, the torsion damping device is arranged so that, when the angular displacement between the first rotating element 7 and the second rotating element 9, 10 reaches a third threshold A3, A3' of angular displacement between the first rotating element 7 and the second rotating element 9, 10 from a resting relative angular position adopted by the second rotating element 9, 10 and the first element when no torque is transmitted, the second spring stage S2 ceases to compress. The block diagram for this embodiment is shown in FIG. 10. This can in particular make it possible to reduce the size of the additional spring or to reduce the quality of its wire.

As the second spring stage S2 ceases to compress on any angular displacement between the first rotating element 7 and the second rotating element 9, 10 greater than the third threshold A3, the angular stiffness of the main damper increases beyond the third threshold A3. The second spring stage ceases to compress when the angular displacement between the phasing element 17 and the second rotating element 9, 10 reaches a fourth threshold of angular displacement A4 between the phasing element and the second rotating element from a resting relative angular position adopted by the phasing element and the second rotating element when no torque is transmitted.

Preferably, the torsion damping device is arranged so that the first spring stage S1 continues to compress when the angular displacement between the first rotating element 7 and the second rotating element 9, 10 exceeds the third threshold A3.

Figure 11:
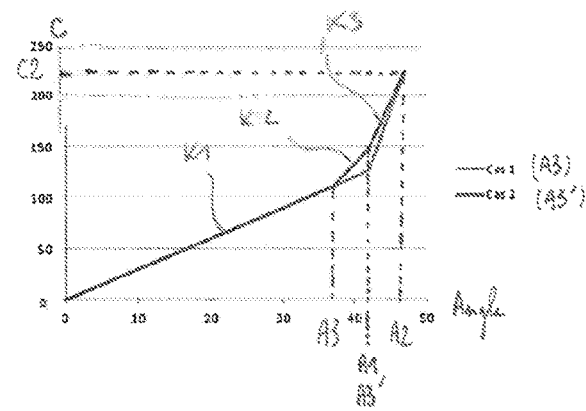
FIG. 11 shows two damping curves of two variants of the second embodiment.

The damping curves for two variants are shown in FIG. 11. In these two variants, the third threshold A3 and A3' of angular displacement between the first rotating element 7 and the second rotating element 9, 10 is less than or equal to the first threshold A1 of angular displacement between the first 7 and second 9, 10 rotating elements.

Thus, by switching from an operating phase with two stages in series to an operating phase with a single spring stage on the main damper, before the first stop 39 and complementary second stop 40 are pressing against each other, the angular stiffness of the damper is increased in the entire angular displacement range for which greater stiffness is desired, i.e. the angular displacement range in which the additional spring 25 is compressed.

Thus, if the curve in FIG. 6 and the scenario 2 curve in FIG. 11 are compared, if the angular stiffness of each spring is considered to be identical, a greater angular stiffness on the second gradient (for which the additional spring is compressed) is obtained for scenario 2 in FIG. 11 than for the example in FIG. 6. This increase in angular stiffness is obtained due to the phasing element 17 and the second rotating element 9, 10 stopping against each other.

In FIG. 11, the characteristic damping curves for two scenarios are shown. In scenario 1, the third threshold A3 of angular displacement between the first rotating element 7 and the second rotating element 9, 10 is less than the first threshold A1 of angular displacement between the first 7 and second 9, 10 rotating elements.

Preferably, the angle separating the first angular displacement threshold A1 and the third angular displacement threshold A3 is less than 10 degrees, preferably less than 5 degrees.

This makes it possible to generate a connecting gradient and to create a transition between the start angular stiffness and the end angular stiffness.

In scenario 1, the first and second thresholds A1 and A3 are such that the third threshold A3 is less than the first threshold A1.

The characteristic damping curve shows, in the direct transmission direction, three successive stiffness gradients K1, K2 and K3; K1 being the stiffness obtained for an angular displacement less than the third threshold A3, K2 being the stiffness obtained for an angular displacement greater than the third threshold A3 and less than the first threshold A1, and K3 being the stiffness obtained for an angular displacement greater than the first threshold A1.

Preferably, here $1<K2/K1<5$, and preferably: $2<K2/K1<4$

Thus, the creation of discontinuities is avoided, which can for example generate problems relating to first-order filtering in the engine.

Preferably, in the characteristic damping curve, the ratio between two successive gradients is less than 3.

In scenario 2, the third threshold A3' of angular displacement between the first rotating element 7 and the second rotating element 9, 10 is substantially equal to the first threshold A1 of angular displacement between the first 7 and second 9, 10 rotating elements. It must be noted that for scenario 1, the stiffness of the spring 25 is less than the stiffness of the spring 25 in scenario 2, and this is why the gradients of the curves at the end of displacement are different.

Two variants are possible for immobilizing the second spring stage.

Firstly, it is possible for the springs of the second stage S2 to reach their compression limit, particularly with their coils solid, when the angular displacement between the first rotating element 7 and the second rotating element 9, 10 reaches the third threshold A3.

In one variant, provision can be made for the second rotating element 9, 10 and the phasing element 17 to respectively include a third stop 61 and a fourth stop 60, arranged so that: when the angular displacement between the first rotating element 7 and the second rotating element 9, 10 reaches a third threshold A3, A3' of angular displacement between the first rotating element 7 and the second rotating element 9, 10 from a resting relative angular position adopted by the second rotating element 9, 10 and the first element when no torque is transmitted, the third stop 61 and the fourth stop 60 are pressing against each other and the second spring stage S2 ceases to compress when the angular displacement between the first rotating element 7 and the second rotating element 9, 10 increases beyond the third threshold A3.

Figure 12:
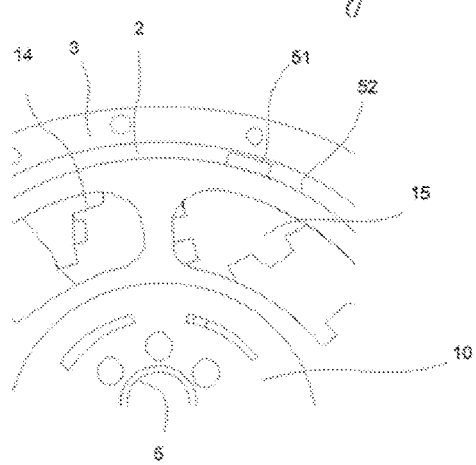
FIG. 12 shows a variant of the second embodiment.

An example of this variant is shown in FIG. 12. In this example, the third stop 61 is formed by a lug incorporated into the guide washer 10 of the second rotating element. This lug 52 extends axially.

According to one embodiment, the fourth stop 60 is formed by a lug formed on the insert 15 of the phasing element 17. This lug can extend radially outwards.

Other variants of the torsion damping device can be implemented without departing from the scope of the invention. For example, the system in which the torsion damping device is mounted can be any system within a torque transmission line that requires torsion damping, such as a clutch disc, or a dual mass flywheel.

The functions of the main damper and the secondary damper can be performed by a single spring or by any number of springs, optionally in series or parallel.

The stopping of the additional guide washers on the second rotating element can be carried out differently, for example by other stops arranged close to the centre of the washer.

The roles of the drive plate and the guide washers can be reversed, the drive plate becoming the second rotating element and the guide washers becoming the first rotating element.

The invention claimed is:

1. Torsion damping device for a vehicle transmission line, comprising:
   a first rotating element for transmitting a torque;
   a second rotating element for transmitting the torque;
   a main damper including at least one main spring inserted between the first rotating element and the second rotating element and permitting, when it deforms, the relative rotation about an axis of rotation of the first and second rotating elements;
   the torsion damping device including:
   a third rotating element for transmitting the torque mounted rotating in relation to the first and second rotating elements about said axis of rotation;
   an additional damper including at least one additional spring mounted both in the first rotating element and in the third rotating element;
   the second and third rotating elements respectively including a first stop and a complementary second stop, arranged so that: when the angular displacement between the first and second rotating elements is greater than zero and less than a first threshold of angular displacement between the first and second rotating elements from a resting relative angular position of the first and second rotating elements in which no torque is transmitted, said at least one main spring is compressed while the third rotating element is rotatably coupled to the first rotating element via the uncompressed additional spring; and when the angular displacement between the first and second rotating elements is greater than said first threshold, the first stop and the complementary second stop are pressing against each other, the at least one main spring being compressed and the at least one additional spring being compressed in parallel between the first rotating element and the third rotating element.

2. The device according to claim 1, wherein the first rotating element includes at least one first additional recess and in that the third rotating element includes at least one second additional recess, the at least one first and second additional recesses being arranged axially facing so that the at least one additional spring is inserted into these facing recesses.

3. The device according to claim 2, wherein the first rotating element includes at least one arm extending radially and arranged circumferentially between two main springs, one of said first additional recesses being formed on this arm.

4. The device according to claim 1, wherein the at least one main spring and the at least one additional spring are arranged so that at least one portion of the additional spring is located radially in the same plane perpendicular to said axis as one portion of the main spring.

5. The device according to claim 1, wherein the at least one main spring includes an outer radial edge and an inner radial edge and the at least one additional spring is arranged at least partially in a core centered on said axis and radially delimited by the inner and outer radial edges of the at least one main spring.

6. The device according to claim 1, wherein the main damper includes at least two main springs arranged in series and in that an additional spring is arranged circumferentially between two main springs.

7. The device according to claim 6, wherein the main damper includes at least two groups of main springs, the main springs being arranged in series in each group, and in that an additional spring is arranged circumferentially between two springs of two groups of main springs.

8. The device according to claim 7, wherein the main springs are arranged in series in each group by means of a phasing element, connecting in each group two consecutive main springs arranged in series.

9. The device according to claim 6, wherein the main springs of the main damper are divided into a first spring stage and second spring stage, the first spring stage and the second spring stage being arranged in series by means of a phasing element, the torsion damping device being arranged so that, when the angular displacement between the first rotating element and the second rotating element reaches a third threshold of angular displacement between the first rotating element and the second rotating element from a resting relative angular position adopted by the second rotating element and the first element when no torque is transmitted, the second spring stage ceases to compress.

10. The device according to claim 9, wherein the third threshold of angular displacement between the first rotating element and the second rotating element is less than or greater than the first threshold, and the angle separating the first threshold of angular displacement and the third threshold of angular displacement is less than 10 degrees.

11. The device according to claim 9, wherein the second rotating element and the phasing element respectively include a third stop and a fourth stop, arranged so that: when the angular displacement between the first rotating element and the second rotating element reaches the third threshold of angular displacement between the first rotating element and the second rotating element from a resting relative angular position adopted by the second rotating element and the first element when no torque is transmitted, the third stop and the fourth stop are pressing against each other and the second spring stage ceases to compress when the angular displacement between the first rotating element and the second rotating element increases beyond the third threshold.

12. The device according to claim 9, wherein, when the first and third thresholds are such that the third threshold is less than the first threshold, and when the characteristic damping curve shows, in one transmission direction, three successive stiffness gradients K1, K2 and K3; K1 being the stiffness obtained for an angular displacement less than the third threshold, K2 being the stiffness obtained for an angular displacement greater than the third threshold and less than the first threshold, and K3 being the stiffness obtained for an angular displacement greater than the first threshold;

$1 < K2/K1 < 5$.

13. The device according to claim 9, wherein the ratio of the stiffness of the additional damper to the stiffness of the main damper, when the first spring stage and the second spring stage of the main damper are working in series, is between 2 and 10.

14. The device according to claim 1, wherein the first threshold is comprised between 15 and 65 degrees.

15. The device according to claim 1 wherein one of the first rotating element and the second rotating element is rotatably coupled to a clutch disc and the other of the first rotating element and the second rotating element is rotatably coupled to a hub.

16. The device according to claim 1, wherein the third rotating element includes two additional guide washers arranged on either side of the first rotating element and axially holding the additional springs, and the second rotating element includes two main guide washers axially holding the main springs, each additional guide washer being arranged axially between the first rotating element and a main guide washer.

17. The device according to claim 1, wherein said first and second complementary stops are arranged radially outside the main springs.

* * * * *